United States Patent [19]

Yamane

[11] Patent Number: 5,775,768
[45] Date of Patent: Jul. 7, 1998

[54] SEALING STRUCTURE FOR FRONT DOOR

[75] Inventor: Tadanao Yamane, Hiroshima, Japan

[73] Assignee: Nishikawa Rubber Co., Ltd., Hiroshima, Japan

[21] Appl. No.: 611,746

[22] Filed: Mar. 6, 1996

[30] Foreign Application Priority Data

Mar. 30, 1995 [JP] Japan ................. 7-100265

[51] Int. Cl.$^6$ ................. B60J 10/08
[52] U.S. Cl. ................. 296/146.9
[58] Field of Search ................. 296/146.9, 146.15, 296/93; 49/483.1, 484.1, 490.1, 495.1, 498.1, 500.1

[56] References Cited

U.S. PATENT DOCUMENTS

| 4,496,186 | 1/1985 | Tuchiya et al. | 296/146.9 |
| 4,532,741 | 8/1985 | Kundel | 296/93 |
| 4,907,838 | 3/1990 | Reaney | 296/146.9 |
| 5,029,931 | 7/1991 | Asaba et al. | 196/93 |
| 5,056,850 | 10/1991 | Katcherian et al. | 196/93 |
| 5,139,305 | 8/1992 | Kranz et al. | 296/146.9 |
| 5,261,721 | 11/1993 | Conger et al. | 296/146.15 |

FOREIGN PATENT DOCUMENTS

| 0 401 985 A2 | 12/1990 | European Pat. Off. | |
| 564005 | 10/1993 | European Pat. Off. | 296/146.9 |
| 0 582 499 A1 | 2/1994 | European Pat. Off. | |
| 38 24 793 A1 | 1/1990 | Germany | |
| 40 29 091 A1 | 3/1992 | Germany | |
| 2259729 | 3/1993 | United Kingdom | 296/146.9 |

Primary Examiner—Gary C. Hoge
Attorney, Agent, or Firm—Flynn, Thiel, Boutell & Tanis, P.C.

[57] ABSTRACT

A sealing structure for sealing the gap between a windshield molding and the front edge of a front door comprises a main flange projecting forward from a front pillar and fitted in the base part having a U-shaped cross section of the windshield molding, an auxiliary flange laterally projecting from the main flange, and a drip sealing weather strip integrally comprising a trim having a U-shaped cross section and fitted on the auxiliary flange, a hollow sealing part in elastic contact with the wind shield molding and the front edge of the front door, and a sealing lip in elastic contact with the inner surface of the front door. The inner side wall of the drip sealing weather strip facing the base part of the windshield molding has easily bendable portions in a base portion and a middle portion thereof. The easily bendable portions may be a groove formed in the outer surface of the base portion of the inner side wall and a groove formed in the inner surface of the middle portion of the same side wall or portions having a reduced thickness. A groove may be formed in the outer surface of a front end portion of the inner side wall of the hollow sealing part so as to receive an edge of the windshield molding.

13 Claims, 5 Drawing Sheets

SEALING STRUCTURE FOR FRONT DOOR

BACKGROUND OF THE INVENTION

1. Field of the Invention

The present invention relates to a sealing structure for sealing the gap between a windshield molding framing a windshield, and the front edge of a front door, capable of satisfactorily sealing the gap even if the windshield molding is badly fitted.

2. Description of the Related Art

A conventional sealing structure for sealing the gap between a windshield molding 20 framing a windshield 10, and the front edge of a front door 30 employs a drip sealing weather strip 50 as shown in FIG. 1 integrally comprising a base part 51 fitted on a flange 41 fastened to a front pillar 40 with screws 45, a hollow sealing part 52 in elastic contact with both the windshield molding 20 and the front edge of the front door 30 to seal the gap between the windshield molding 20 and the front door 30, and a sealing lip 53 in elastic contact with the inner surface of the front door 30.

Another conventional sealing structure for the same purpose employs a drip sealing weather strip 55 as shown in FIG. 2 integrally comprising a U-shaped trim 56 fitted on a flange 26 formed integrally with a holding member 25, i.e., a windshield molding, formed of a vinyl chloride resin by molding and fastened to a front pillar 40 with screws 45, so as to project outward from the outer surface of the holding member 25, a hollow sealing part 57 projecting from the front wall of the U-shaped trim 56 so as to be in elastic contact with the front edge of a front door 30 to seal the gap between the holding member 25 and the front door 30, and a sealing lip 58 projecting from the back wall of the U-shaped trim 56 so as to be in elastic contact with the holding member 25.

These conventional drip sealing weather strips 50 and 55 requires holes 42 for receiving screws to be formed in the front pillar 40. Therefore, these drip sealing weather strips 50 and 55 cannot be applied to front pillars formed by a hydroform process, to which holes for receiving the screws are detrimental. If the windshield molding 20 or the jewelry piece 25 is badly fitted, the hollow sealing part 52 or 57 is unable to be properly in contact with the windshield molding 20 or the jewelry piece 25, which often is a principal cause of wind noise.

SUMMARY OF THE INVENTION

Accordingly, it is an object of the present invention to provide a sealing structure for sealing the gap between a windshield molding and the front door, capable of solving those problems in the conventional sealing structures.

According to a first aspect of the present invention, a sealing structure comprises a main flange projecting forward from a front pillar and fitted in the base part having a U-shaped cross section of a windshield molding; an auxiliary flange laterally projecting from the main flange; and a drip sealing weather strip integrally comprising a trim having a U-shaped cross section and fitted on the auxiliary flange, a hollow sealing part in elastic contact with the windshield molding and the front edge of a front door, and a sealing lip in contact with the inner surface of the front door. Easily bendable portions are formed in the the inner side wall of the hollow sealing part facing the base part of the windshield molding at a base portion and a middle portion of the inner side wall of the hollow sealing part facing the base part of the windshield molding, respectively.

According to a second aspect of the present invention, the inner side wall of the hollow sealing part of the drip sealing weather strip is bent in an outward concave shape along the easily bendable portion in the middle portion of the inner side wall.

According to a third aspect of the present invention, a groove is formed in a front end portion of the inner side wall of the hollow sealing part of the drip sealing weather strip so as to receive an edge of the windshield molding.

When the drip sealing weather strip is depressed from the front, the base portion of the inner side wall bends elastically in an outward convex shape and the middle portion of the same bends elastically in an outward concave shape. Consequently, the height of hollow sealing part varies elastically according to the position of the windshield molding so that the hollow sealing part is always in elastic contact with the windshield molding and the front edge of the front door to seal the gap between the windshield and the front edge of the front door, and a fixed step is maintained between the windshield molding and the hollow sealing part. Thus, the gap between the windshield molding and the front edge of the front door can be satisfactorily sealed and wind noise can be suppressed.

Since any holes for receiving screws need not be formed in the front pillar to mount the the sealing structure of the present invention on the front pillar, the sealing structure of the present invention can be applied to a front pillar formed by a hydroform process.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
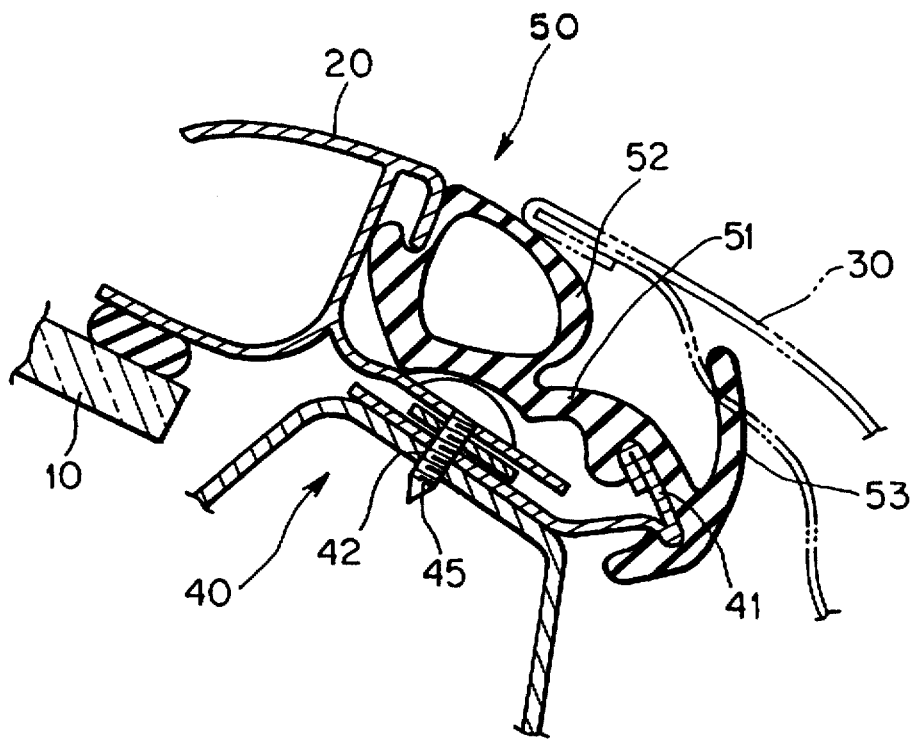
FIG. 1 is sectional view of a conventional sealing structure.
Figure 2:
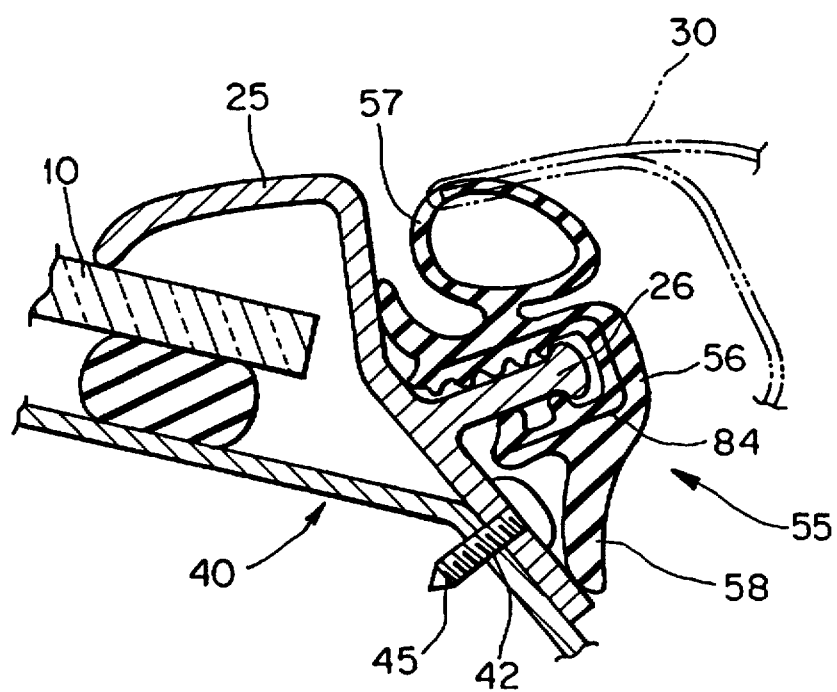
FIG. 2 is a sectional view of another conventional sealing structure.
Figure 3:
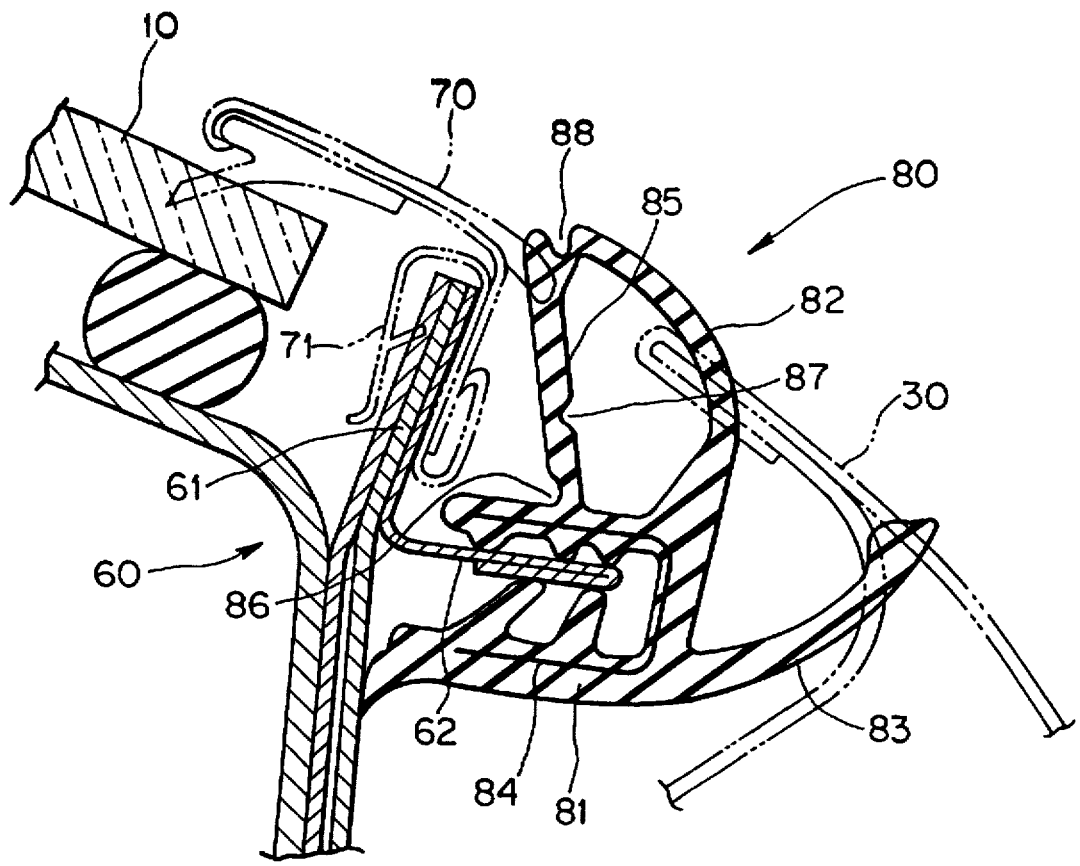
FIG. 3 is a sectional view of a sealing structure in a preferred embodiment according to the present invention.
Figure 4:
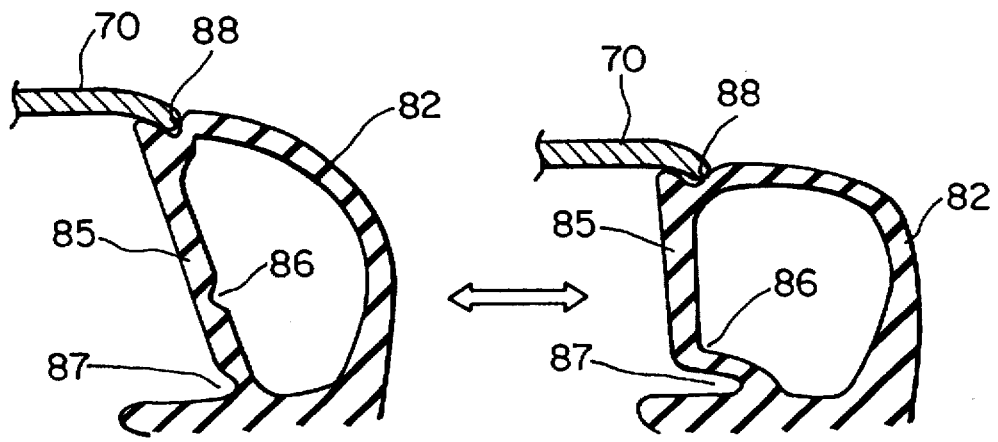
FIG. 4 is a sectional view of a modification of the hollow sealing part of a drip sealing weather strip included in the sealing structure of FIG. 3.
Figure 5:
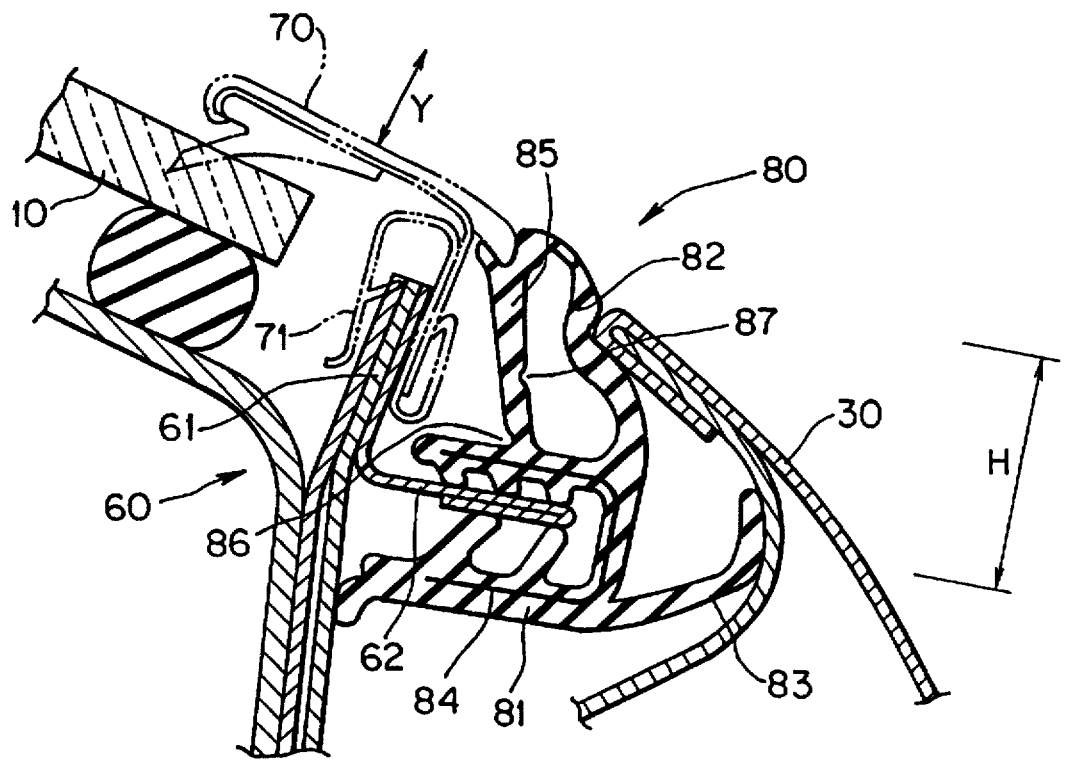
FIG. 5 is a sectional view, corresponding to FIG. 3, showing a state of the sealing structure when the windshield molding is dislocated to the front from a correct position, in which the front door is closed.
Figure 6:
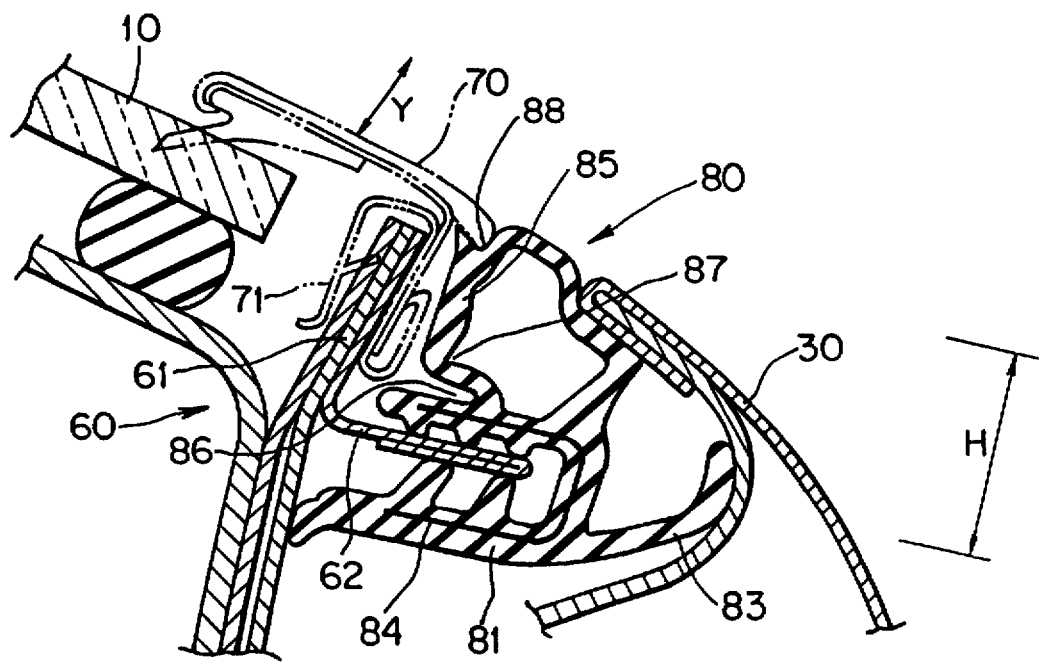
FIG. 6 is a sectional view, corresponding to FIG. 3, showing a state of the sealing structure when the windshield molding is dislocated to the rear from a correct position, in which the front door is closed.

Referring to FIGS. 3 to 7, there are shown a windshield 10, a front door 30, a front pillar 60 formed by a hydroform process, a main flange 61, i.e., a laminate plate, attached to the side surface of the front pillar 60 so as to project forward, an auxiliary flange 62 laterally projecting from the side surface of the main flange 61, a windshield molding 70 attached to the main flange 61 to cover the edge of the windshield 10, and a drip sealing weather strip 80 integrally comprising a U-shaped trim 81 fitted on the auxiliary flange 62, a hollow sealing part 82 in elastic contact with windshield molding 70 and the front edge of the front door 30 to seal the gap between the windshield molding 70 and the front edge of the front door 30, a sealing lip 83 projecting from the trim 81 so as to be in contact with the inner surface of the front door 30, and a core 84 buried in the trim 81.

The base part 71 having a U-shaped cross section of the windshield molding 70 is fitted on the main flange 61. The hollow sealing part 82 extends from the front wall of the trim 81, and has an inner side wall 85 facing the base part 71 of the windshield molding 70. As shown in FIGS. 3 to 6, the inner side wall 85 has an easily bendable portion 86 in its base portion and an easily bendable portion 87 ink it middle portion. When the windshield is of uneven position as shown by arrow Y in FIGS. 5 and 6, the hollow sealing portion 82 is depressed, the base portion of the inner side wall 85 bends elastically in an outward convex shape along the easily bendable portion 86 and bends elastically in an outward concave shape along the easily bendable portion 87, so that the height H of the hollow sealing part 82 changes.

Figure 7:
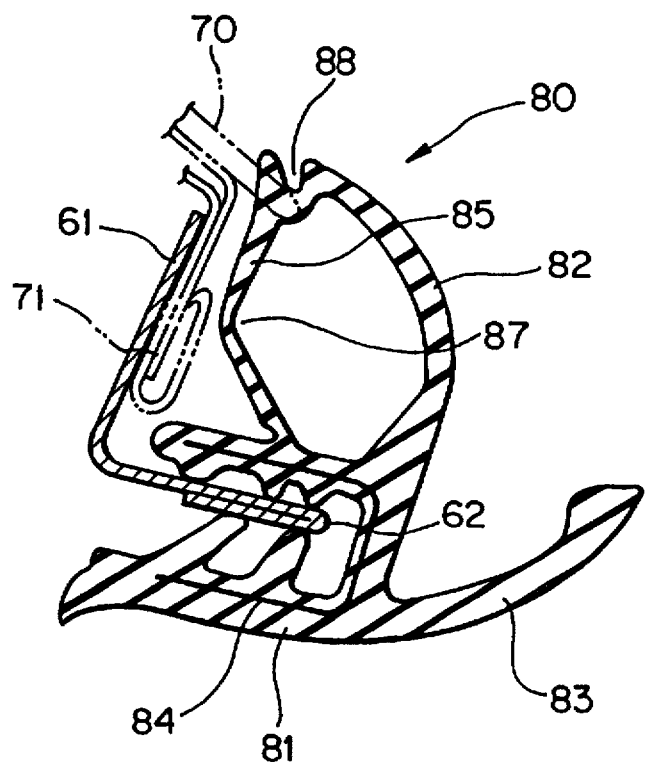
FIG. 7 is a fragmentary sectional view of an essential portion of a sealing structure in another embodiment according to the present invention.

The inner side wall 85 may be formed in an outward concave shape bent along the easily bendable portion 87 as shown in FIG. 7. The inner side wall 85 may be provided with a groove 88 capable of receiving the edge of the windshield molding 70 in the outer surface of its front end. The easily bendable portions 86 and 87 of the inner side wall 85 of the drip sealing weather strip 80 may be grooves formed in the outer surface of the base portion and in the inner surface of the middle portion of the inner side wall 85 as shown in FIGS. 3 to 6 or may be those having a reduced thickness as shown in FIG. 7.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A sealing structure for sealing the gap between a windshield molding and the front edge of a front door, said sealing structure comprising:
    a main flange projecting forward from a front pillar and fitted in a base part of the windshield molding which has a U-shaped cross section;
    an auxiliary flange laterally projecting from the main flange;
    and a drip sealing weather strip comprising:
        a trim having a U-shaped cross section which is fitted on the auxiliary flange,
        a hollow sealing part which is supported on said trim and has a first section disposed in elastic contact with the windshield molding and a second section disposed in elastic contact with the front edge of the front door, and
        a sealing lip in elastic contact with an inner surface of the front door, said trim, said hollow sealing part and said sealing lip being formed integrally together;
    said hollow sealing part having an inner side wall which extends between said first section and said trim and faces inwardly toward the base part of the windshield molding, said inner side wall having easily bendable portions in a base portion and a middle portion thereof such that bending of said inner side wall occurs at said base portion and said middle portion when said windshield molding presses against said first section.

2. A sealing structure according to claim 1, wherein the easily bendable portions of the inner side wall of the drip sealing weather strip are defined by a groove formed in an outer surface of the base portion of the inner side wall and a groove formed in an inner surface of the middle portion of the inner side wall which faces away from said outer surface.

3. A sealing structure according to claim 1, wherein the easily bendable portions of the inner side wall of the drip sealing weather strip are defined by portions having a reduced thickness.

4. A sealing structure according to claim 1, wherein the inner side wall of the hollow sealing part of the drip sealing weather strip is bent in an outward concave shape along the easily bendable portion in the middle portion thereof.

5. A sealing structure according to claim 1, wherein said windshield molding includes an edge protecting toward said drip sealing weather strip, and said first section is defined by a front end portion of the inner side wall of the hollow sealing part of the drip sealing weather strip, said front edge portion including a groove so as to receive said edge of the windshield molding.

6. A sealing structure according to claim 1, wherein said inner side wall is generally L-shaped between said first section and said trim when said easily bendable portions are bent.

7. A sealing structure according to claim 6, wherein said easily bendable portions bend in opposite inner and outer directions to define said L-shape.

8. A sealing structure for sealing a gap between a windshield molding and a door edge section of a vehicle door, said sealing structure comprising:
    a main flange projecting from a front pillar of the vehicle, said windshield molding having a base part which is fitted on said main flange and a molding edge section supported on said base part;
    an auxiliary flange projecting from said front pillar; and
    an elongate drip sealing weather strip which has a trim section fitted on said auxiliary flange and a sealing lip projecting away from said trim section into elastic contact with an inner surface of the vehicle door, said weather strip further including a hollow sealing part which is supported on said trim section and comprises elastic inner and outer side walls projecting away from said trim section into elastic contact with said molding edge section and said door edge section respectively, said outer side wall having a first wall section disposed in contact with an opposing surface of said vehicle door, said inner side wall having a second wall section disposed in contact with an opposing surface of said molding edge section, said inner side wall including bending means defined by a plurality of elastic bendable portions in said inner side wall so that said inner side wall bends at said bendable portions when said second wall section is pressed by said molding edge section for adjusting a distance between said second wall section and said trim section, said bendable portions being spaced apart from each other.

9. A sealing structure according to claim 8, wherein said bendable portions are defined by a base portion of said inner side wall disposed proximate said trim section and a middle portion of said inner side wall disposed between said base portion and said second wall section.

10. A sealing structure according to claim 9, wherein said bendable portions permit bending of said inner side wall in opposite directions so that said inner side wall is generally L-shaped between said second wall section and said trim section when bent.

11. A sealing structure according to claim 10, wherein said bendable portions have a reduced thickness relative to remaining portions of said inner side wall.

12. A sealing structure according to claim 10, wherein each of said bendable portions is defined by a groove formed in a surface of said inner side wall.

13. A sealing structure according to claim 9, wherein said windshield molding secures a windshield to said front pillar and said base part thereof is movably secured to said main flange wherein said hollow sealing body is compressed by said windshield molding, said inner side wall being bendable only about said bendable portions when said hollow sealing body is compressed.

* * * * *

UNITED STATES PATENT AND TRADEMARK OFFICE
CERTIFICATE OF CORRECTION

PATENT NO. : 5 775 768
DATED : July 7, 1998
INVENTOR(S) : Tadanao Yamane

It is certified that error appears in the above-indentified patent and that said Letters Patent is hereby corrected as shown below:

Column 4, line 18; change "protecting" to ---projecting---.

Signed and Sealed this

Eighth Day of December, 1998

Attest:

BRUCE LEHMAN

Attesting Officer

Commissioner of Patents and Trademarks